US007676081B2

(12) United States Patent
Blake et al.

(10) Patent No.: US 7,676,081 B2
(45) Date of Patent: Mar. 9, 2010

(54) IMAGE SEGMENTATION OF FOREGROUND FROM BACKGROUND LAYERS

(75) Inventors: Andrew Blake, Cambridge (GB);
Antonio Criminisi, Cambridge (GB);
Geoffrey Cross, Cambridge (GB);
Vladimir Kolmogorov, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1148 days.

(21) Appl. No.: 11/252,017

(22) Filed: Oct. 17, 2005

(65) Prior Publication Data

US 2006/0285747 A1 Dec. 21, 2006

Related U.S. Application Data

(60) Provisional application No. 60/691,865, filed on Jun. 17, 2005.

(51) Int. Cl.
*G06K 9/34* (2006.01)
(52) U.S. Cl. ................... 382/164; 382/180; 358/538
(58) Field of Classification Search ........... 382/164, 382/180; 358/538
See application file for complete search history.

(56) References Cited

U.S. PATENT DOCUMENTS

| 6,670,963 | B2 * | 12/2003 | Osberger ................... 345/629 |
| 7,085,401 | B2 * | 8/2006 | Averbuch et al. ............ 382/103 |
| 2001/0024469 | A1 * | 9/2001 | Keren et al. ............ 375/240.01 |
| 2006/0187305 | A1 * | 8/2006 | Trivedi et al. ............... 348/169 |

OTHER PUBLICATIONS

Yuri Y. Boykov; "Interactive Graph Cuts for Optimal Boundary & Region Segmentation of Objects in N-D Images"; IEEE Int'l Conference on Computer Vision, vol. 1, Jul. 7-14, 2001, pp. 105-112.*

* cited by examiner

*Primary Examiner*—Vikkram Bali
*Assistant Examiner*—Eueng-Nan Yeh

(57) ABSTRACT

Segmentation of foreground from background layers in an image may be provided by a segmentation process which may be based on one or more factors including motion, color, contrast, and the like. Color, motion, and optionally contrast information may be probabilistically fused to infer foreground and/or background layers accurately and efficiently. A likelihood of motion vs. non-motion may be automatically learned from training data and then fused with a contrast-sensitive color model. Segmentation may then be solved efficiently by an optimization algorithm such as a graph cut.

19 Claims, 11 Drawing Sheets

IMAGE SEGMENTATION OF FOREGROUND FROM BACKGROUND LAYERS

CROSS-REFERENCE TO RELATED APPLICATIONS

This application claims the benefit of U.S. Provisional Patent Application Ser. No. 60/691,865, filed Jun. 17, 2005, titled MONOCULAR IMAGE SEGMENTATION, which is incorporated herein by reference.

BACKGROUND

Separating a foreground layer from video in real time may be useful in many applications such as live background substitution, pan/tilt/zoom, object insertion, and the like in teleconferencing, live meeting, or other video display applications. Separating a foreground layer in real time demands layer separation to near Computer Graphics quality, including transparencies determination as in video-matting, but with computational efficiency sufficient to attain live streaming speed.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Real-time segmentation of foreground from background layers in conventional monocular video sequences may be provided by a segmentation process which may be based on one or more factors including motion, color, contrast, and the like. Automatic separation of layers from color/contrast or from motion alone may include errors. To reduce segmentation errors, color, motion, and optionally contrast information may be probabilistically fused to infer foreground and/or background layers accurately and efficiently. In this manner, pixel velocities are not needed. Therefore, a number of issues related to optical flow estimation are removed. Instead, a likelihood of motion vs. non-motion may be automatically learned from training data and then fused with a contrast-sensitive color model. Segmentation may then be solved efficiently by an optimization algorithm such as a graph cut. As used herein, optimization may include scoring one or more optional results and selecting the optional result with the score exceeding some threshold or being the best of a plurality of scores. For example, optimization may include selecting the optional result with the highest score. In some cases, scoring of optional results may include considering the optional result with the minimum energy.

Accuracy of foreground/background separation is demonstrated as described below in the application of live background substitution and shown to give convincingly good quality composite video output. However, it is to be appreciated that segmentation of foreground and background in images may have various applications and uses.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a segmentation system, the system described is provided as an example and not a limitation. As those skilled in the art will appreciate, the present examples are suitable for application in a variety of different types of image processing systems.

Figure 1:
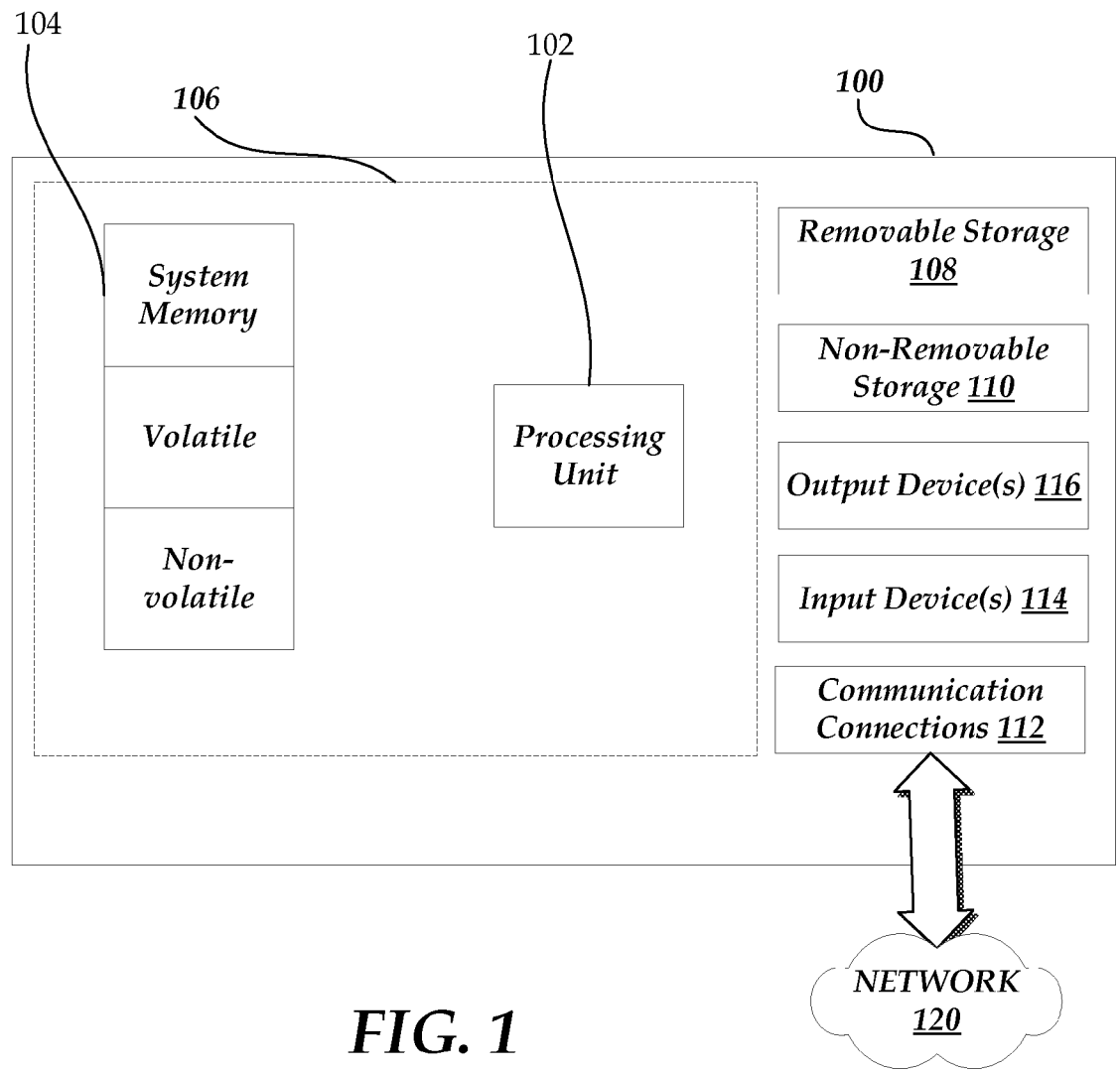
FIG. 1 illustrates an example system for implementing a monocular-based image processing system.

FIG. 1 and the following discussion are intended to provide a brief, general description of a suitable computing environment in which an image processing system may be implemented to segment the foreground regions of the image from the background regions. The operating environment of FIG. 1 is only one example of a suitable operating environment and is not intended to suggest any limitation as to the scope of use or functionality of the operating environment. Other well known computing systems, environments, and/or configurations that may be suitable for use with a monocular-based image processing system described herein include, but are not limited to, personal computers, server computers, hand-held or laptop devices, multiprocessor systems, micro-processor based systems, programmable consumer electronics, network personal computers, mini computers, mainframe computers, distributed computing environments that include any of the above systems or devices, and the like.

Although not required, the image processing system will be described in the general context of computer-executable instructions, such as program modules, being executed by one or more computers or other devices. Generally, program modules include routines, programs, objects, components, data structures, etc., that perform particular tasks or implement particular abstract data types. Typically, the functionality of the program modules may be combined or distributed as desired in various environments.

With reference to FIG. 1, an exemplary system for implementing the image processing system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features and/or functionality. For example, device 100 may also include additional storage (e.g., removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules, or other data. Memory 104, removable storage 108, and non-removable storage 110 are all examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which can be used to store the desired information and which can be accessed by device 100. Any such computer storage media may be part of device 100.

Device 100 may also contain communication connection(s) 112 that allow the device 100 to communicate with other devices, such as with other computing devices through network 120. Communications connection(s) 112 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes both storage media and communication media.

Those skilled in the art will realize that storage devices utilized to store program instructions can be distributed across a network. For example a remote computer may store an example of the process described as software. A local or terminal computer may access the remote computer and download a part or all of the software to run the program. Alternatively, the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Device 100 may also have input device(s) 114 such as keyboard, mouse, pen, voice input device, touch input device, laser range finder, infra-red cameras, video input devices, and/or any other input device. Output device(s) 116 such as one or more displays, speakers, printers, and/or any other output device may also be included.

Digital video cameras are useful in both consumer and professional contexts. Generally, digital video cameras capture sequences of digital images, which may then be transferred to a computing device for display or processing or to a storage device for storage. One example employs a digital video camera in a video conferencing application. In a typical video conference, an image sequence depicting a conference participant is transmitted to one or more other participants. Concurrently, image sequences depicting the other participants are transmitted to the first participant's display device. In this manner, each participant can view a video of the other participants during the conference.

Figure 2:
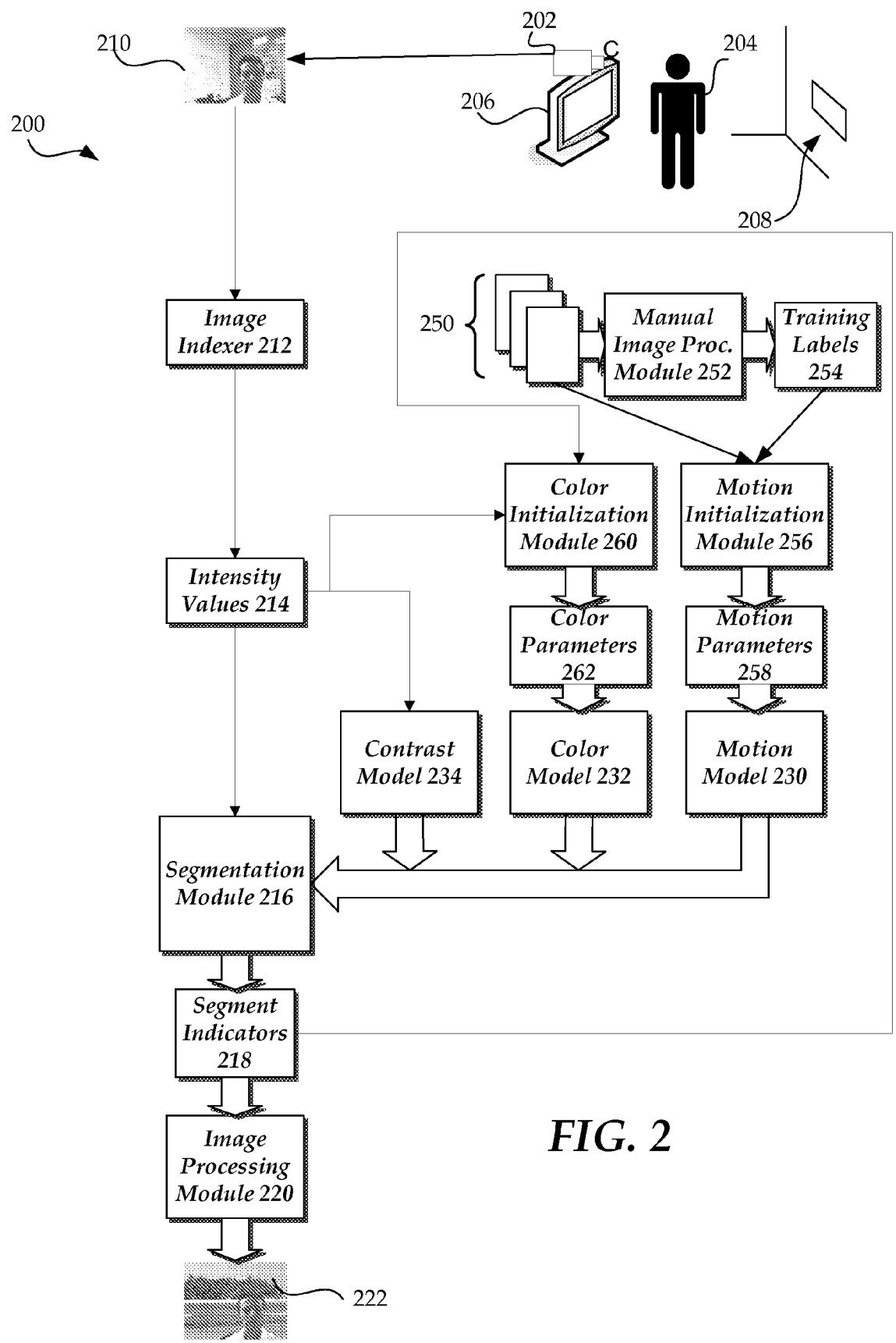
FIG. 2 illustrates an example schematic diagram of an image processing system.

FIG. 2 illustrates a typical video teleconferencing environment 200 with a single video camera 202 focused on a conference participant 204, who views the other participants in a video display frame in his or her display device 206. The video camera 202 is commonly mounted on or near the display 206 of a computing device with a wide field of view in an attempt to keep the participant framed within the field of view of the video camera. However, the wide field of view also captures the background 208 of the scene. It is to be appreciated that alternative camera and display set ups may be used as appropriate, such as alternative locations, orientations, number of cameras, number of participants, and the like.

Interactive color/contrast-based segmentation techniques have been demonstrated to be effective in segmenting foreground and background in single static images. Since segmentation based on color/contrast alone requires manual manipulation in defining areas of the foreground and background, color/contrast segmentation is beyond the capability of fully automatic methods.

To segment the foreground layer accurately and/or efficiently (e.g., automatically) such that it can be applied in real time to video images, a robust approach that exploits a fusion of a variety of cues may be used. For example, a fusion of motion with color and contrast, and a prior for intra-layer spatial coherence may be implemented to segment foreground information in a video stream of images. By fusing stereo, color, and contrast, foreground/background separation may be achieved at about 10 fps with stereo imaging techniques. Similar segmentation accuracy can be achieved with conventional monocular cameras, which may be at an even higher speed.

In an alternative example, stereo likelihoods, whether or not fused with color and/or contrast, may be augmented with motion likelihoods. Stereo likelihoods are described in V. Kolmogorov, et al., "Bi-layer segmentation of binocular stereo video," In Proc. Conf. Comp. Vision Pattern Rec., San Diego, Calif., June 2005, and in U.S. patent application Ser. No. 11/195,027, filed Aug. 2, 2005, titled STEREO-BASED SEGMENTATION, which are incorporated herein by reference. Specifically, motion may be similarly fused with stereo likelihoods and optionally color and/or contrast likelihoods in a stereo image processing system.

In the prior art, pixel velocities, e.g., motion, are typically estimated by applying optical flow algorithms. For purposes of segmentation, the optical flow may then be split into regions according to predefined motion models. However, solving for optical flow is typically an under-constrained problem, and thus a number of "smoothness" constraints may be added to regularize the solution. Unfortunately, regularization techniques may produce inaccuracies along object boundaries. In the case of segmentation, residual effects such as boundary inaccuracies may be undesirable as they may produce incorrect foreground/background transitions. To reduce the residual effects of regularization techniques, rather than computing full velocities, motion may be distinguished from non-motion events through a likelihood ratio test. The motion likelihood function, learned from training examples may then be probabilistically fused with color/contrast likelihoods and spatial priors to achieve a more accurate segmentation. Furthermore, reducing the need for full velocity computation may be convenient in terms of algorithmic efficiency.

FIG. 2 illustrates an example image processing system to automatically separate foreground and background in an image sequence. The example image processing system uses a probabilistic model and an energy minimization technique which may be used as a basis of image segmentation. The accurately extracted foreground can be composited substantially free of aliasing with different static or moving backgrounds, which may be useful in video-conferencing applications.

In the example of FIG. 2, the input image 210 is monocular, i.e., accepting images from a single monocular video input device 202. However, it is to be appreciated that the input images may be stereo as well, and may be fused with stereo likelihoods in the energy function of equation (1) below.

The input image from the video input device 202 may be input to an intensity indexer 212 which may index a plurality of the pixels from the image according to their respective intensity. An appropriate amount of pixels from the input image may be indexed. For example, the entire image may be indexed, a portion of the input image may be indexed such as one or more scan lines, epipolar lines in a stereo system, and the like. As shown in FIG. 2, the intensity indexer 212 may output the intensity values 214 of the pixels of the input image. The intensity values may be stored in any suitable manner and in any suitable format, such as in a data array in a data store.

A data store may include one or more of a relational database, object-oriented database, unstructured database, an in-memory database, sequential memory, or other data store. A storage array is a form of a data store and may be constructed using a flat file system such as ASCII text, a binary file, data transmitted across a communication network, or any other file system. Notwithstanding these possible implementations of the foregoing or any other data store, the term data store and storage array as used herein refer to any data that is collected and stored in any manner accessible by a computing device.

With reference to FIG. 2, given an input sequence of images, an input image frame 210 at time t may be represented as an array z of N pixels in RGB color space. The array or plurality of indexed N pixels may be indicated as $z=(z_1, z_2, \ldots, z_n, \ldots, z_N)$, indexed by the single index n. The indexed pixels z may be input to a segmentation module 216 to segment the foreground from the background. To segment the pixels of the input image, each pixel may be defined as either foreground or background based on input from a motion model 230, a color model 232, and an optional contrast model 234. For example, a plurality of pixels in the input image may be labeled by the segmentation module 216 as foreground or background by one or more segmentation indicators 218, each segmentation indicator being associated with one or more pixels of the input image.

The segmentation of the image frame 210 may be expressed as a corresponding array or plurality of opacity or segmentation state values $\alpha=(\alpha_1, \alpha_2, \ldots, \alpha_n, \ldots, \alpha_N)$ (shown as segmentation indicators 218 in FIG. 2), where the value of $\alpha_n$ may indicate the segmentation layer of the associated pixel with a segmentation indicator. The segmentation indicators may be stored in any suitable format and manner, such as in a data store.

The segmentation may be hard segmentation (i.e., a pixel may be classified as either foreground or background). Foreground and background segment indicators or labels may have any suitable value, such as binary values, text labels, integer values, real values, and the like. In one example, the segment indicator $\alpha_n$ for a pixel n may be of the set of either 0 or 1. In one example, a value of 0 may indicate background, and a value of 1 may be foreground. In some cases, null and/or negative values may be used to indicate a particular segmentation state of layer. In another example, the foreground segmentation indicator may be string of "F" while the background segmentation indicator may be a string of "B". It is to be appreciated that other labels, values, number of labels and the like may be used. Fractional opacities or segmentation indicator values are possible and may indicate an unknown or likely state of the associated pixel. Fractional opacities (i.e., $\alpha$'s) may be computed using any suitable technique, such as the $\alpha$-matting technique using SPS discussed further below, border matting as described further in Rother et al., "GrabCut: Interactive foreground extraction using iterated graph cuts," ACM Trans. Graph., vol. 23, No. 3, 2004, pp. 309-314, which is incorporated herein by reference, and the like.

Identification of pixels in the input image as foreground or background may be done by the segmentation module 216 of FIG. 2 in any suitable manner. For example, segmentation based on motion may be fused with color segmentation and optionally contrast segmentation. The resulting image from motion segmentation alone is not merely fused with an image resulting from color and/or contrast segmentation, but rather, the segmentation module accounts for motion as well as color and optionally contrast using the motion model 230, color model 232, and optionally the contrast model 234.

To determine the segmentation indicators 218 of the input image 210, the segmentation module 216 may receive at least one input image 210 to be separated into foreground and background segments. The image 210 may be represented as an array of pixel values 214, which may be in the RGB color space, as determined by the image indexer 212. The segmentation module 216 may determine a segmentation indicator for each of a plurality of pixels in the input image 210 which minimizes an energy function. The energy function may include the motion model 230, the color model 232, and optionally the contrast model 234. The minimization of the energy function may be done in any suitable manner, such as through graph cut on binary labels as described by Boykov et al, cited below. The energy function may include one or more elements including motion likelihoods, color likelihoods, and optionally contrast likelihoods. The motion likelihood may use the generated motion parameters from the motion initialization module, the pixel values of the input image, the temporal derivative of each pixel in the plurality of pixels in the input image, and the spatial gradient of each pixel in the plurality of pixels of the input image. The contrast likelihood may use the pixel values of the input image. The color likelihood term may use the generated color parameters from the color initialization module, pixel values of the prior image, and the estimated segment indicators associated with the pixels in the prior image as determined initially by the motion likelihood and optionally the contrast likelihood.

To determine the motion parameters of the motion model 230, a set of one or more training images 250 may be input to a manual image processing module 252, where a user may manually or interactively define the foreground and background segments of the training images. The manual image processing module may use any suitable technique to define the foreground and background labels for pixels in the training images, such as the techniques of Boykov et al., "Interactive graph cuts for optimal boundary and region segmentation of objects in N-D images," Proc. Int'l Conf. on Computer Vision, 2001, and Rother et al., "Interactive foreground extraction using iterated graph cuts," ACM Trans. Graph., vol. 23, no. 3, 2004, pp. 309-314, both of which are incorporated herein by reference. The manual image processing module may output a plurality of training segment indicators 254, with each segment indicator being associated with a pixel in the training images. The segment indicator indicates whether the associated pixel in the training image is either foreground or background. The segment indicators for the pixels of the training images may be stored in any suitable manner and in any suitable format, such as in a data array which may be stored in a data store.

A motion initialization module 256 may receive the segment indicators 254 of the training image pixels and determine the motion parameter values of a likelihood ratio of motion versus non-motion events. The motion parameter values, discussed further below, may minimize the classification error of the labels of the training data. For example, expectation maximization may be used to fit a Gaussian mixture model to the foreground distributions of temporal and spatial gradients of the pixels in the labeled training images. Another Gaussian mixture model may be fit to the background distributions of temporal and spatial gradients of the pixels in the labeled training images. More particularly, the temporal and spatial gradient may be determined for and associated with a plurality of pixels in the training images, and the Gaussians fit to each temporal and spatial gradient pair for the plurality of pixels in the training images, which may be pooled together from the manually segmented training images. In this manner, the motion initialization module 256 may output the motion parameters 258, which may be stored in any suitable manner and format, such as in a data store. The motion parameters 258 may be used in the motion model 230 by the segmentation module 216 to determine the motion likelihoods.

A color likelihood initialization module 260 may determine the parameters of a color likelihood algorithm in a color model 232 in any suitable manner. For example, the color likelihood initialization module may use a technique as described by Rother et al., cited above and described further below. More particularly, a Gaussian mixture model may be fit to one or more previously segmented image frames prior to the input image 210 to be segmented. The Gaussian mixture model may be fit using expectation maximization to the foreground pixels of the one or more prior images and the associated segmentation indicators and a Gaussian mixture model may be fit using expectation maximization to the background pixels of the one or more prior images and the associated segmentation indicators. In this manner, the color initialization module 260 may output the color parameters 262 which may be stored in any suitable manner and in any suitable format, such as in a data store, and used in the color model 232 by the segmentation module 216 to determine the color likelihoods.

The optional contrast model 234 may affect the spatial prior, which may force the resulting segmentation values to follow or consider natural object contours as defined by color contrast values. The spatial smoothness term may be determined in any suitable manner. Specifically, the contrast model may receive the pixel values of the input image and provide contrast terms as discussed further below.

The segmentation indicators 218 (e.g., labels of foreground, background) from the segmentation module 216 and their associated pixels of the input image 210 may be used by an image processor 220 to modify and/or process the input image 210 based on the segmentation indicators 218 to produce an output image 222. For example, the image processor may extract at least a portion of the foreground pixels and composite them with an alternative background image which may be of an alternative scene, a single color, a displayed object from another application such as a spreadsheet or presentation application and the like. In another example, at least a portion of the background pixels may be replaced with an alternative background image. The background image may be any suitable image, such as an alternative location scene (e.g., a beach), input from another application such as presentation slides, and the like. In another example, at least a portion of the pixels associated with a segmentation state value indicating a background segment may be compressed at a different fidelity than the foreground pixels. In this manner, the image compression may retain a high fidelity for the foreground pixels, and a lower fidelity for the portion of background pixels. In yet another example, the background pixels may be separated from the foreground pixels and communicated separately to a recipient, such as in a teleconferencing application. Subsequent frames of the teleconference video stream may send the recipient only the foreground pixels, which may be combined with an alternative background image or the stored background pixels from a previous transmission. In another example, a dynamic emoticon may interact with a foreground object in the image. For example, the dynamic emoticon may orbit around the foreground object as described further in U.S. application Ser. No. 11/066,946, filed Feb. 25, 2005, which is incorporated herein by reference. In another example, the identified foreground pixels in the image may be used to size and/or place a frame around the foreground pixels of the process image (e.g., smart-framing), and may limit display of the background pixels. In another example, the identified foreground pixels in the input image ma be used to size and/or locate a frame around the foreground pixels of the input image (e.g., smart-framing), and may limit display of the background pixels. It is to be appreciated that the image processor may process or modify a display or stored image using the segmented pixels in any suitable manner and the above image processing description is provided as an example and not a limitation.

Segmentation by Energy Minimization

Similar to Boykov et al., "Interactive graph cuts for optimal boundary and region segmentation of objects in N-D images," Proc. Int'l Conf. on Computer Vision, 2001, and Rother et al., "Interactive foreground extraction using iterated graph cuts," ACM Trans. Graph., vol. 23, no. 3, 2004, pp. 309-314, the segmentation problem of one or more input images may be cast as an energy minimization task. The energy function E to be minimized by the segmentation module 216 of FIG. 2 may be given by the sum of data and smoothness terms. For example, the energy function E may be given by a sum of the motion likelihood and the color likelihood and in some cases, the spatial coherence (or contrast smoothness) likelihood, and may be represented as:

$$E(\alpha,k,\theta,k^M,\theta^M,z) = V(\alpha,z) + U^C(\alpha,k,\theta,z) + U^M(\alpha,k^M,\theta^M,g,\dot{z}) \quad (1)$$

where V( ) is the spatial smoothness term based on contrast, $U^C$ is the color likelihood, and $U^M$ is the motion likelihood, all of which are described further below.

Having defined the energy with equation (1), the optimal or sufficiently optimal segmentation indicators $\alpha$ of the input image pixels may be determined by estimating the global minimum of the energy equation, such as by using:

$$\hat{\alpha} = \arg\min_\alpha E(\alpha,k,\theta,k^M,\theta^M,z) \quad (2)$$

Minimization of the energy may be done efficiently through any suitable optimization method, such as graph-cut on binary labels, described further in Boykov et al., cited above. As described further below, the optimal values for the color parameters k and θ may be learned such as through expectation maximization from segmented images in the video series prior to the input image; the motion parameters $k^M$ and $\theta^M$ may be learned such as through expectation maximization from any suitable segmented training images.

The Gibbs energies may be defined as probabilistic models of the factors used in the segmentation module 216 of FIG. 2. For example, the segmentation module may consider a motion likelihood model 230 and a color likelihood model 232. The motion likelihood model 230 may provide a model of the motion likelihood function based on the motion parameters and the color likelihood model 232 may provide a model of the color likelihood function based on the color parameters. As noted above, the segmentation module may also include a contrast likelihood model 234. The next sections define each of the terms in equation (1) that may be provided by the models 230, 232, 234 to the segmentation module 216 of FIG. 2.

Likelihood for Color ($U^C$)

The color likelihood model 232 of FIG. 2 may be based on any suitable color likelihood model. For example, a two-layer segmentation may model likelihoods for color in foreground and background using Gaussian mixture models. An example suitable Gaussian mixture model for color is outlined here for clarity and described further in U.S. patent application Ser. No. 10/861,771, filed Jun. 3, 2004, titled FOREGROUND EXTRACTION USING ITERATED GRAPH CUTS, and U.S. patent application Ser. No. 11/195,027, filed Aug. 2, 2005, titled STEREO-BASED IMAGE SEGMENTATION, which are incorporated herein by reference. Another suitable color model is described further in Rother, et al., cited above, and is outlined here for clarity.

Foreground and background colors may be modeled by two Gaussian mixture models (GMM), one for the background and one for the foreground. Each GMM has K components (typically K=20) with full covariance. The assignments of pixels to the corresponding GMM components may be stored in any suitable manner, such as in a data store as the vector $k=(k_1, k_2, \ldots, k_n, \ldots, k_N)$ with $k_n$ being an element of the set of a range of integers from 1 to K. Each GMM component belongs to either the foreground or the background GMM.

The color likelihood can be written as:

$$U^C(\alpha,k,\theta,z) = \Sigma D(\alpha_n, k_n, \theta, z_n) \quad (3)$$

where θ includes the parameters of the GMM models, defined below, and where $D(\alpha_n, k_n, \theta, z_n) = -\log p(z_n|\alpha_n, k_n; \theta) - \log \pi(\pi_n; k_n)$ with p( ) being a Gaussian probability distribution, and π( ) including the mixture weighting coefficients. Therefore, the function D may be restated as:

$$D(\alpha_n k_n, \theta, z_n) = -\log\pi(\alpha_n, k_n) + \frac{1}{2}\log \quad (4)$$

$$det\sum(\alpha_n, k_n) + \frac{1}{2}[z_n - \mu(\alpha_n, k_n)]^T \sum(\alpha_n, k_n)^{-1}[z_n - \mu(\alpha_n, k_n)]$$

with μ and Σ respectively being the means and covariances of the 2K Gaussian components of foreground and background distributions. Therefore, the parameters of the color model are $\theta=\{\pi(\alpha,k),\mu(\alpha,k),\Sigma(\alpha,k),\alpha=\{0,1\}, k=(1,\ldots,K)\}$.

The equation (3) above for the color likelihood includes only the global color model, and not a pixel-wise model. However, it is to be appreciated that a pixel-wise model may be implemented in addition to or alternative to the global color model. The color likelihood described further in U.S. patent application Ser. No. 11/195,027, filed Aug. 2, 2005, titled STEREO-BASED SEGMENTATION, may be appropriate and is described briefly here for clarity. For example, using Gaussian mixture models, the foreground color model $p(z|x+F)$ is a spatially global Gaussian mixture initialized or learned from foreground pixels. In the background, there is a similar initialized or learned Gaussian mixture $p(z|x+B)$. The background model may also include a per-pixel single Gaussian density $p_k(z_k)$ available wherever a stability flag indicates that there has been stasis over a sufficient number of previous frames. The stability flag may indicate stability or instability in any particular manner, such as with binary values, textual values, multiple indicators, and the like. In this manner, the combined color model may be given by a color energy $U^C_k$ which may be represented as:

$$U^{c_k}(z_k, x_k) = \quad (5)$$
$$\begin{cases} -\log p(z_k|a_k) & \text{if } \alpha = F \\ -\log\left[\left(1 + \frac{s_k}{2}\right)p(z_k|x_k = B) + \frac{s_k}{2}p_k(z_k)\right] & \text{if } \alpha = B \end{cases}$$

where $s_k$ is the stability flag indicator having a value of 0 or 1. The background color model illustrates a mixture between the global background model and the pixelwise background model, however, it is to be appreciated that any suitable background and/or foreground models may be used. The use of the pixelwise approach in the background model may allow, in some cases, informative information to be extracted. However, the pixelwise approach may be sensitive to movement in the background, which effect may be decreased by adding the global background distribution $p(z_k|x_k+B)$ as the contamination component in the mixture. Since the foreground subject is most likely moving and the cameras stationary, a majority of the background may be unchanging over time. However, it is to be appreciated that the pixelwise and/or global portions of the background portion of equation (5) may be removed for simplicity or any other suitable reason.

The Gaussian mixture models may be modeled within a color space the red-green-blue (RGB) color space and may be initialized in any suitable manner. The color space may be any suitable color space, including red-green-blue (RGB), YUV, HSB, CIE Lab, CIE Luv, and the like. The Gaussian mixture model may be learned from one or more segmented image frames in the video sequence prior to the input image to be segmented. Notice that unlike single image segmentation, the parameters color parameters θ and k, in monocular foreground background segmentation, for frame t may be estimated through Expectation Maximization from the segmentation at frame t−1. Furthermore, a single iteration may be used for each frame t, although it is to be appreciated that multiple iterations may be used.

In another example, the parameters of the Gaussians may be initialized to a default value, such as all pixels may be initialized to background. In either case, as the parameter estimations improve, the effect or influence of the color likelihood in the image segmentation may be increased. For example, the color likelihood could be switched on substantially abruptly when parameters values are initialized. Alternatively, the color term may be dialed in to gradually increase its influence, such as by using a weighting term. The dial in period, may be any suitable period and may be approximately several seconds or in another example approximately 100 frames.

The background model may be enhanced by mixing in a probability density learned, for each pixel, by pixelwise background maintenance. Pixelwise background maintenance is discussed further in Rowe et al., "Statistical mosaics for tracking," J. Image and Vision Computing, Vol. 14, 1996, pp. 549-564, and Stauffer et al., "Adaptive background mixture models for real-time tracking," Proc. CVPR, 1999, pp. 246-252, which are both incorporated herein by reference. As with the Gaussian parameters, the probability density may be initialized in any suitable manner, such as by learning from previously labeled images, bootstrapping initialization by setting pixel labels to default values, and the like.

Using Gaussian mixture models, the foreground color model $p(z|\alpha=1)$ is a spatially global Gaussian mixture initialized or learned from foreground pixels. In the background, there is a similar initialized or learned Gaussian mixture $p(z|\alpha=0)$. The background model may also include a per-pixel single Gaussian density $p_k(z_k)$ available wherever a stability flag indicates that there has been stasis over a sufficient number of previous frames. The stability flag may indicate stability or instability in any particular manner, such as with binary values, textual values, multiple indicators, and the like.

Contrast Model

A contrast likelihood model, such as contrast likelihood model 234 of FIG. 2, may improve segmentation boundaries to align with contours of high image contrast. Any suitable color contrast model may be used, such as the contrast likelihood model discussed further in Boykov, et al., "Interactive graph cuts for optimal boundary and region segmentation of objects in N-D images," Proc. Int. Conf. on Computer Vision, 2001, which is incorporated herein by reference and outlined here for clarity.

As in interactive foreground extraction with graph cuts, the contrast model influences the pairwise energies V and the contrast energy V based on color contrast may be represented as:

$$V(\overline{\alpha}, z) = \sum_{(m,n) \in C} \gamma I[\alpha_n \neq \alpha_m] \frac{1}{1+\epsilon} \left( \epsilon + e^{-\beta \|z_m - z_n\|^2} \right) \quad (6)$$

with the indices m and n being pairwise pixel indices of horizontal, diagonal, and vertical cliques in the input image. The parameter $\beta$ is the contrast modulation constant which may be computed as:

$$\beta = (2 \langle (z_m - z_n)^2 \rangle)^{-1} \quad (7)$$

where $\langle \ \rangle$ denotes the expectation over an image sample. The function $I[\alpha_n \neq \alpha_m]$ is an identity function that acts as a binary switch that is active across a transition in or out of the foreground state.

An optional strength parameter $\gamma$ may be multiplied by the terms in the contrast model. The strength parameter may indicate the coherence prior and the contrast likelihood, and may be adjusted experimentally. In some cases, the strength parameter $\gamma$ may be set approximately equal to ten.

An optional dilution constant parameter $\in$ may be included for contrast. In some cases, the dilution constant $\in$ may be set to zero for pure color and contrast segmentation. However, in many cases where the segmentation is based on more than the color contrast, the dilution constant may be set to any appropriate value, such as 1. In this manner, the influence of the contrast may be diluted in recognition of the increased diversity of segment cues, e.g., from motion and/or color.

Likelihood for Motion

Figure 3:
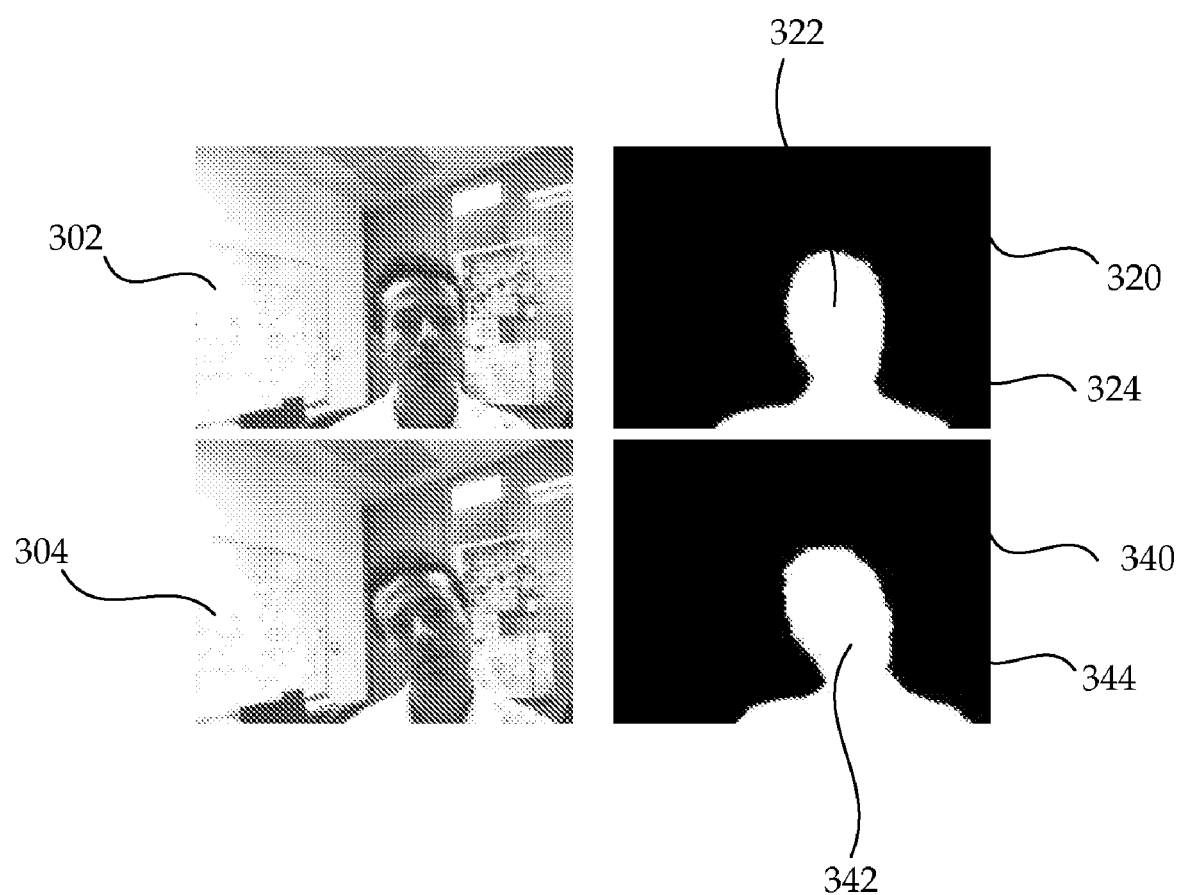
FIG. 3 illustrates two example frames of a training data sequence used for training the motion likelihood and the corresponding manually obtained segmentation masks.

A motion model, such as motion model 230 of FIG. 2, may improve segmentation boundaries on the assumption that moving objects in an image are more likely to be foreground and stationary objects in an image are more likely to be background. The automatic estimation of a reliable motion likelihood may be determined in any suitable manner. For example, a likelihood ratio of motion vs. non-motion events $U^M(\ )$ may be learned automatically from manually segmented frames of a training sequence, and then applied to previously unseen test frames to aid foreground/background separation. FIG. 3 illustrates two example frames 302, 304 of a training data sequence used for training the motion likelihood and the corresponding interactively obtained segmentation masks 320, 340 respectively. In the segmentation masks of FIG. 3, white portions 322, 342 denote foreground, and black portions 324, 344 denote background. In some cases, a gray area (indicating a fractional or other suitable segmentation indicator) may denote uncertain assignment or segmentation (which may occur in complex regions of mixed pixels).

The likelihood of motion function $U^M$ may be estimated by fitting Gaussian mixture models to foreground and background distributions of temporal and spatial gradients of pixels in the labeled training images. Specifically, the pixels in each image frame $I^t$ have associated temporal derivatives which may be indicated as:

$$\dot{z} = (\dot{z}_1, \dot{z}_2, \ldots, \dot{z}_n, \ldots, \dot{z}_N) \quad (8)$$

Spatial gradient magnitudes g may be indicated as:

$$g = (g_1, g_2, \ldots, g_n, \ldots, g_N) \quad (9)$$

Each temporal derivative element $\dot{z}_n$ at time t may be computed as:

$$\dot{z}_n = |G(z_n^t) - G(z_n^{t-1})| \quad (10)$$

where $G(\ )$ is a Gaussian kernel at the scale of $\sigma_t$ pixels. Furthermore, the spatial gradient magnitudes $g_n$ may be determined as:

$$g_n = |\nabla z_n| \quad (11)$$

where $\nabla$ indicates the spatial gradient operator. Spatial derivatives may be computed by convolving the images with first-order derivative of Gaussian kernels with standard deviation $\sigma_s$. A standard expectation maximization algorithm may be used to fit GMMs to all the $(g_n, \dot{z}_n)$ pairs pooled from all the segmented frames of the training sequence.

Figure 4:
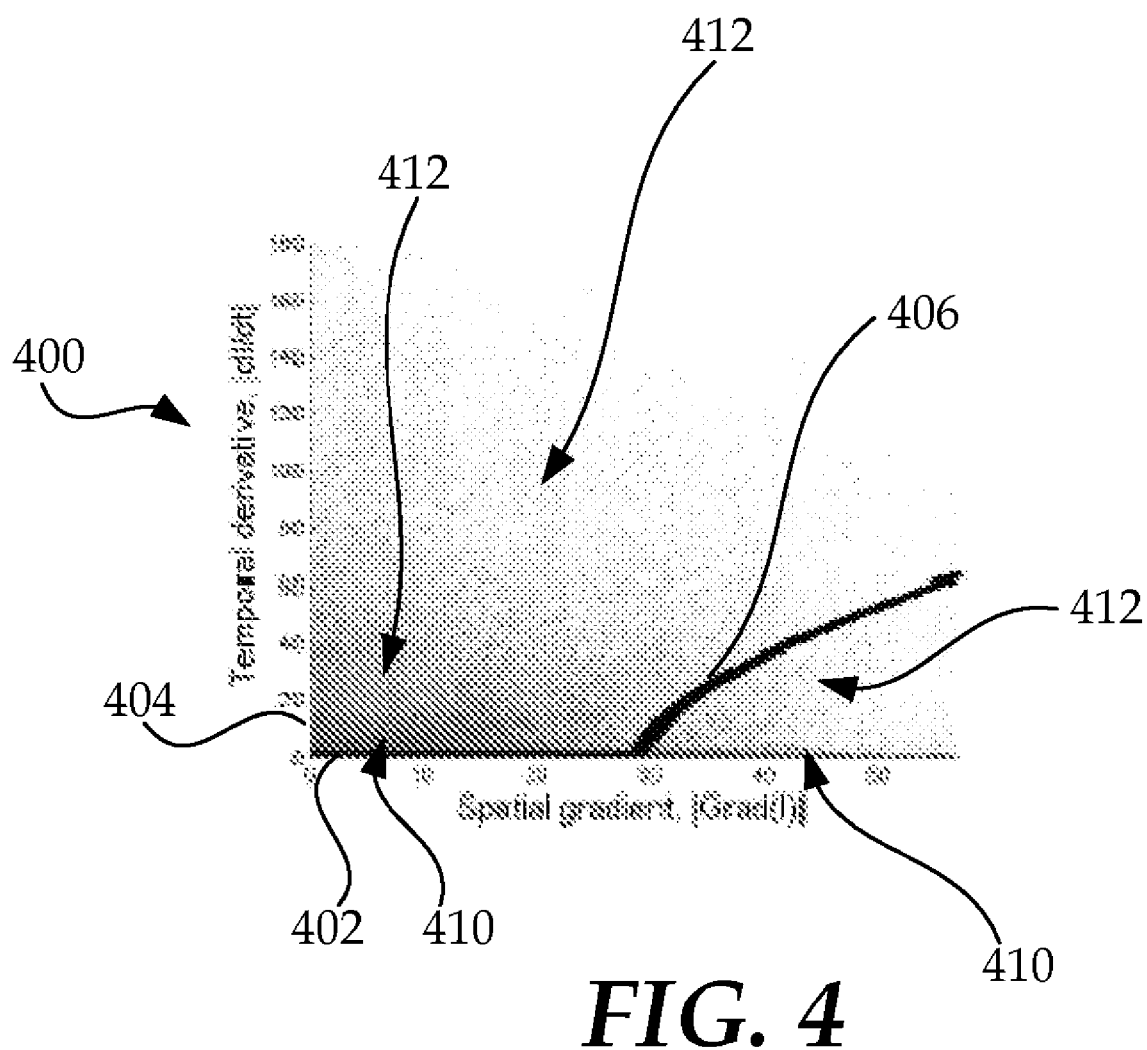
FIG. 4 illustrates an example graph of the training foreground 2D derivative points and the training background derivative points.

FIG. 4 illustrates example training foreground 2D derivative points and the training background derivative points in a graph based on the training images 302, 304 of FIG. 3 and other similar training images in the sequence. The graph 400 of FIG. 4 has an x-axis 402 indicating the spatial gradient and a y-axis 404 indicating the temporal derivative. The optimally separating curve ($U^M = 0$) is plotted as a black line 406. Areas such as areas 410 of the graph 400 indicate background derivative points and areas such as areas 412 indicate foreground derivative points.

$K^M_F$ and $K^M_B$ denote the number of Gaussian components of the foreground and background GMMs, respectively. Thus, the motion likelihood can be written as follows:

$$U^M(\bar{\alpha}, k^M, \bar{\theta}^M, g, \dot{z}) = \sum_n D^M(\alpha_n, k^M_n, \bar{\theta}^M, g_n, z_n) \quad (12)$$

where $$D^M(\alpha_n, k^M_n, \bar{\theta}^M, g_n, \dot{z}_n) = \quad (13)$$

$$-\log\pi(\alpha_n, k^M_n) + \frac{1}{2}\log det\sum(\alpha_n, k^M_n) +$$

$$\frac{1}{2}[v_n - \mu(\alpha_n, k^M_n)]^T \sum(\alpha_n, k^M_n)^{-1}[v_n - \mu(\alpha_n, k^M_n)]$$

with $v_n$ being the 2-vector defined by $v_n = (g_n, \dot{z}_n)^T$, and where $k^M$ indicates the pixel assignments to each Gaussian component of the motion GMMs, and $\mu$ and $\Sigma$ are means and covariances of the $K^M_F + K^M_B$ components of the GMM motion models. Finally, the motion parameters $\theta^M$ collect the mixture weight, mean, and covariance parameters of the motion GMMs and may be determined as $$\theta^M = \{\pi(\alpha, k^M), \mu(\alpha, k^M), \Sigma(\alpha, k^M), \alpha = \{0,1\}, k^M = \{1, \ldots, K_{\{F,B\}}^M\}\} \quad (14)$$

Figure 5:
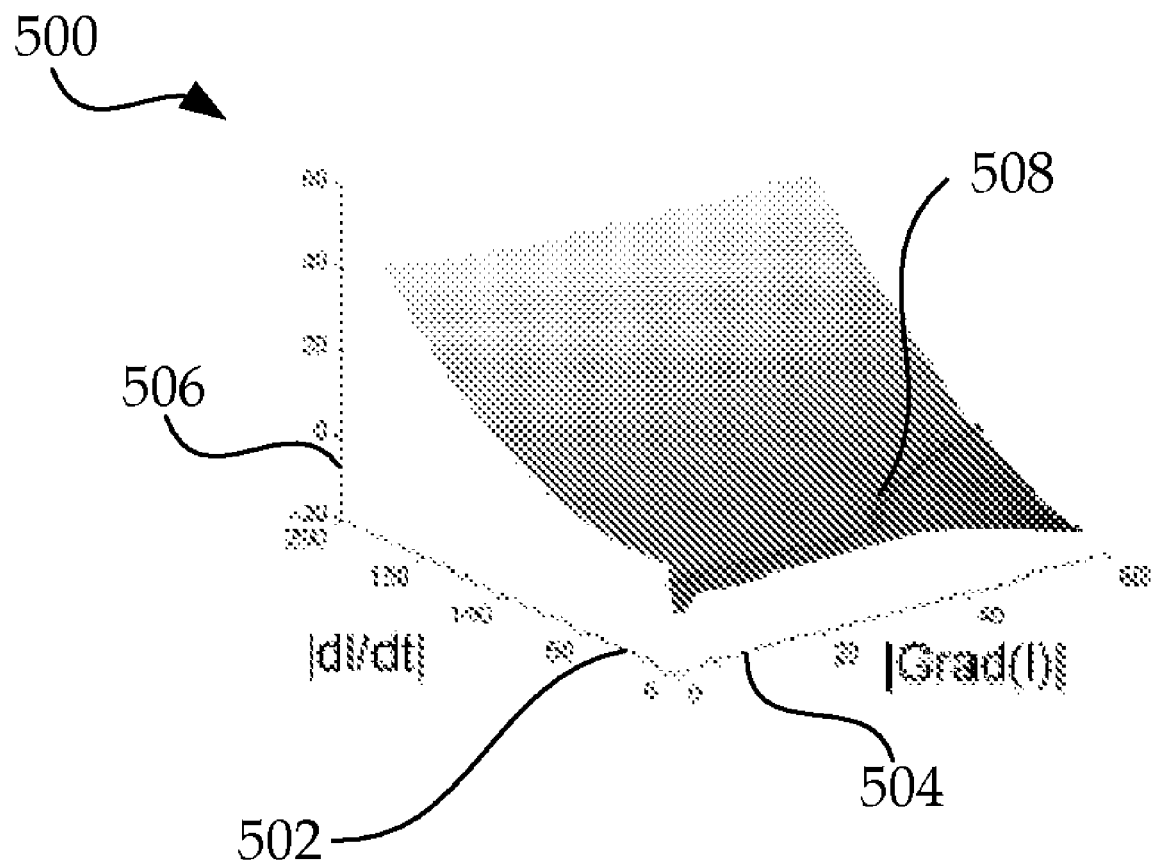
FIG. 5 illustrates an example plot of the training foreground and background derivative points.

In one example of training the labels, the training images may include a series of image sequences. For example, as shown in FIG. 3, the example sequence images 302, 304 illustrate a foreground person talking and moving about in front of a mostly static (though noisy) background. FIG. 5 shows a three-dimensional plot 500 of the automatically learned log-likelihood ratio surface of the training images 302, 304 of FIG. 3. The plot 500 of FIG. 5 has an axis 502 indicating the temporal derivative, an axis 504 indicating the spatial gradient, and an axis 506 indicating the learned motion-based log likelihood ratio. In the plot 500, negative values correspond to background, positive values correspond to foreground, and the locus where $U^M=0$ is shown as a curve 508. As shown in FIG. 5, large temporal derivatives are associated to a large likelihood of that pixel belonging to the foreground and vice versa. However, the example of FIG. 5 also illustrates that the learned separating curve is very different from the often used fixed temporal derivative threshold. Optimal parameters may be found automatically by minimizing classification error on the training data. For the example training images of FIG. 3, this procedure yields the following values:

$$K^M_F = 1 \quad (15)$$

$$K^M_B = 3 \quad (16)$$

$$\sigma_s = 1.2 \text{ pix} \quad (17)$$

$$\sigma_t = 1.2 \text{ pix}. \quad (18)$$

Figure 6:
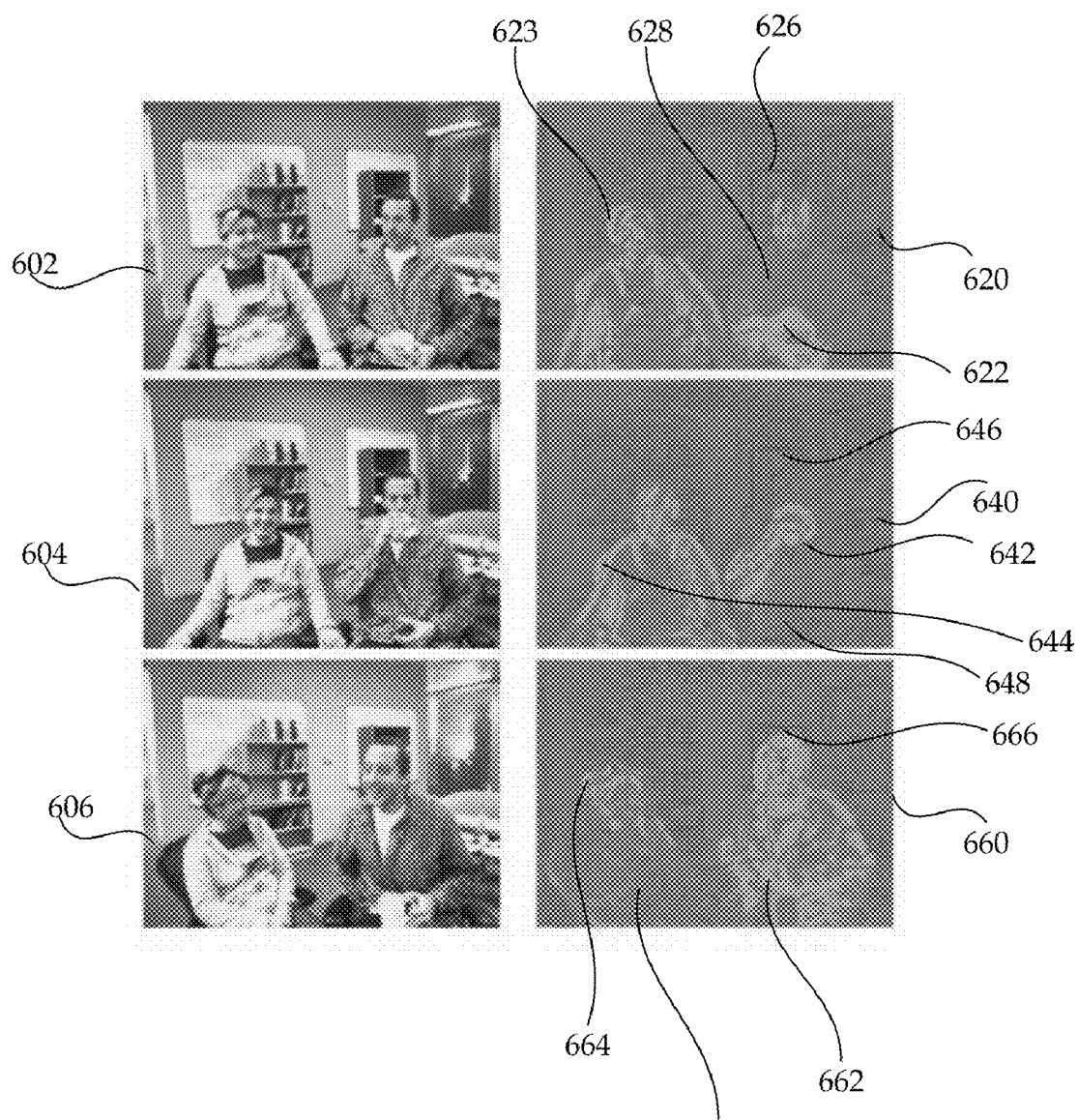
FIG. 6 illustrates an example test sequence and the corresponding motion likelihoods for each pixel.

The learned motion likelihood may be tested. FIG. 6 illustrates example results of applying the likelihood ratio test to three frames 602, 604, 606 of an example test sequence and the corresponding motion likelihoods for each pixel illustrated in the motion frames 620, 640, 660 respectively. Regions of the input image undergoing motion are detected by the trained motion model and are displayed as light gray areas, such as areas 622, 623, 642, 644, 662, 664. The areas of motion are differentiated from detected stationary regions by the trained motion model and are displayed in gray areas, such as areas 626, 646, 666. Furthermore, due to the nature of the learned likelihood, textureless areas (e.g., intrinsically ambiguous areas) such as areas 628, 648, 668, correctly tend to have assigned a mid-grey color (corresponding to $U^M \approx 0$). It is to be appreciated that in the example motion based segmentation of FIG. 6, the motion model was trained with training images 302, 304 of FIG. 3 and the like which are different from the input images 602, 604, 606 of FIG. 6.

FIG. 6 also illustrates that motion alone may not be sufficient for an accurate segmentation. Fusion of motion and color likelihood with Markov Random Fields spatial priors may fill the remaining "holes", e.g., textureless areas, and may produce accurate segmentation masks. For example, a graph cut algorithm may be used to solve the Markov Random Field to produce the accurate segmentation masks.

After determining the motion likelihood, the color likelihood and optionally the contrast likelihood, the energy (given in equation (1) above) may be optimized in any suitable manner. The total energy can be optimized by the segmentation module 216 of FIG. 2. The segmentation module may use any suitable optimization scheme, as appropriate. For example, in the above example of total energy equation (1), optimizing the total energy equation may use layered graph cut. Layered graph cut determines the segmentation state variable values $\alpha$ as the minimum of an energy function E.

Any suitable graph cut algorithm may be used to solve for the segmentation state variables $\alpha$ if the states are limited to foreground and background (i.e., hard segmentation). For example, in a hard segmentation a graph cut algorithm may be used to determine the segmentation via an energy minimization. However, if multiple values of the segmentation state are allowed (e.g., 0, 1, 2, 3, . . . ), the $\alpha$-expansion graph cut may be used to compute the optimal segmentation labels. The $\alpha$-expansion form of graph cut is discussed further in Kolmogorov et al., "Multi-camera scene reconstruction via graph cuts," Proc. ECCV, Copenhagen, Denmark, May 2002, which is incorporated herein by reference. The above two example deal with discrete labels for the segmentation variables, however, if the segmentation values are allowed to reflect real transparency values (e.g., fractional values) then an alpha-matting technique such as border matting or the SPS algorithm may be used. As noted above, border matting is described further in Rother et al., "GrabCut: Interactive foreground extraction using iterated graph cuts," ACM Trans. Graph., vol. 23, No. 3, 2004, pp. 309-314.

Since the human eye is sensitive to flicker artifacts, the optimized segmentation state variable values may be smoothed in some cases such as in the segmentation module 216, following the foreground/background segmentation optimization. For example, the segmentation state variable values may be smoothed in any suitable manner, such as with an $\alpha$-matting using SPS as a post-process, border matting as described further in Rother et al., "GrabCut: Interactive foreground extraction using iterated graph cuts," ACM Trans. Graph., vol. 23, No. 3, 2004, pp. 309-314, and the like. Reducing aliasing may provide a higher level of visual realism, such as in the application of background substitution. Any suitable anti-aliasing techniques may be used such as the border matting techniques described further in Rother et al., "GrabCut: Interactive foreground extraction using iterated graph cuts," ACM Trans. Graph., vol. 23, No. 3, 2004, pp. 309-314, which is incorporated herein by reference.

After optimization and optional smoothing, each determined segmentation state variable value may be associated with its associated pixel in the input image in any suitable manner. For example, the segmentation state variable values 218 may be stored in an array where the location of the value in the array indicates an associated pixel in the associated input image. In another example, a plurality of pixel locations in the image may be associated with a segmentation state variable value, such as grouping contiguous pixels with a single label, and the like.

Figure 7:
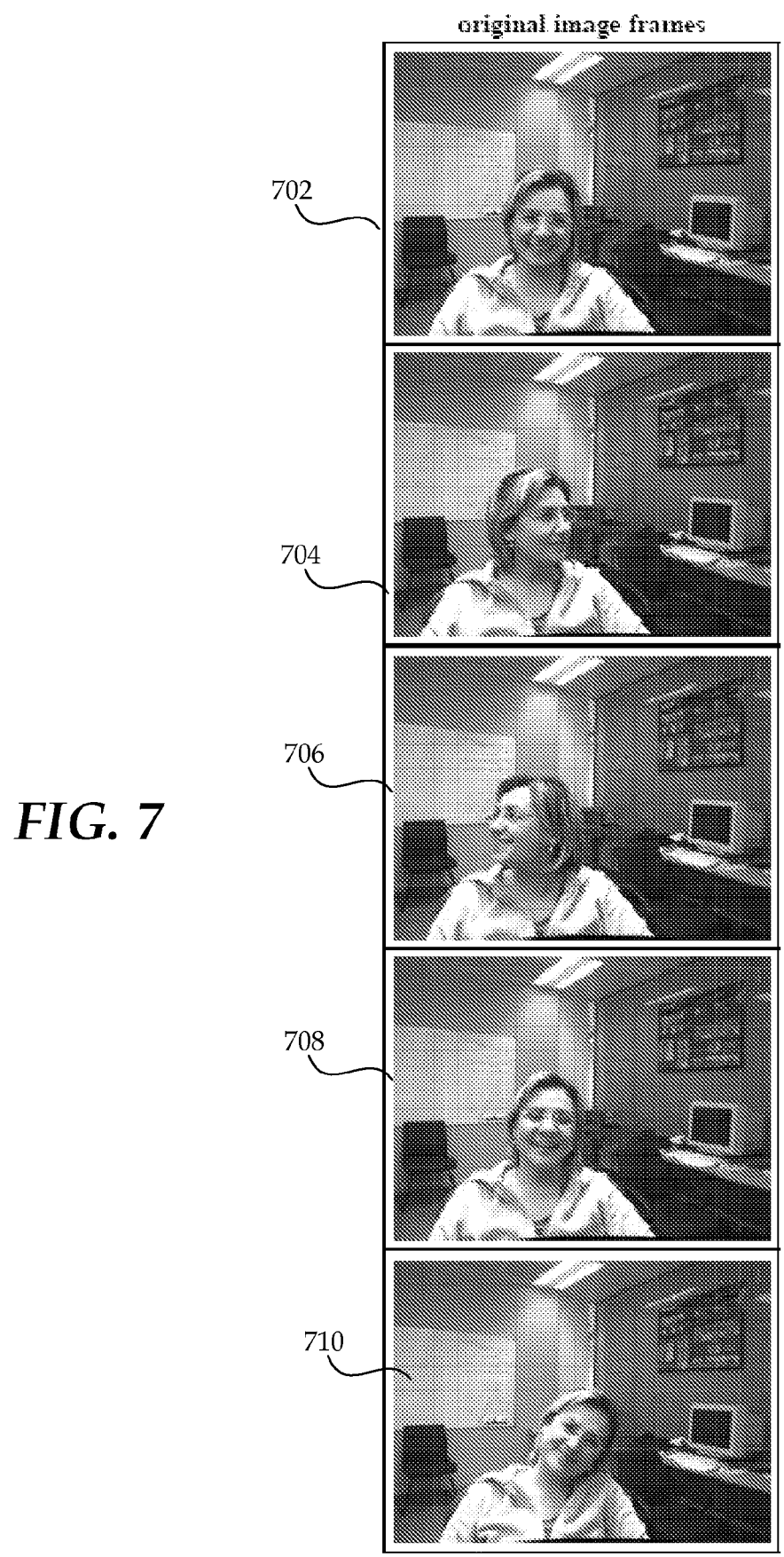
FIG. 7 illustrates an example input image sequence.
Figure 8:
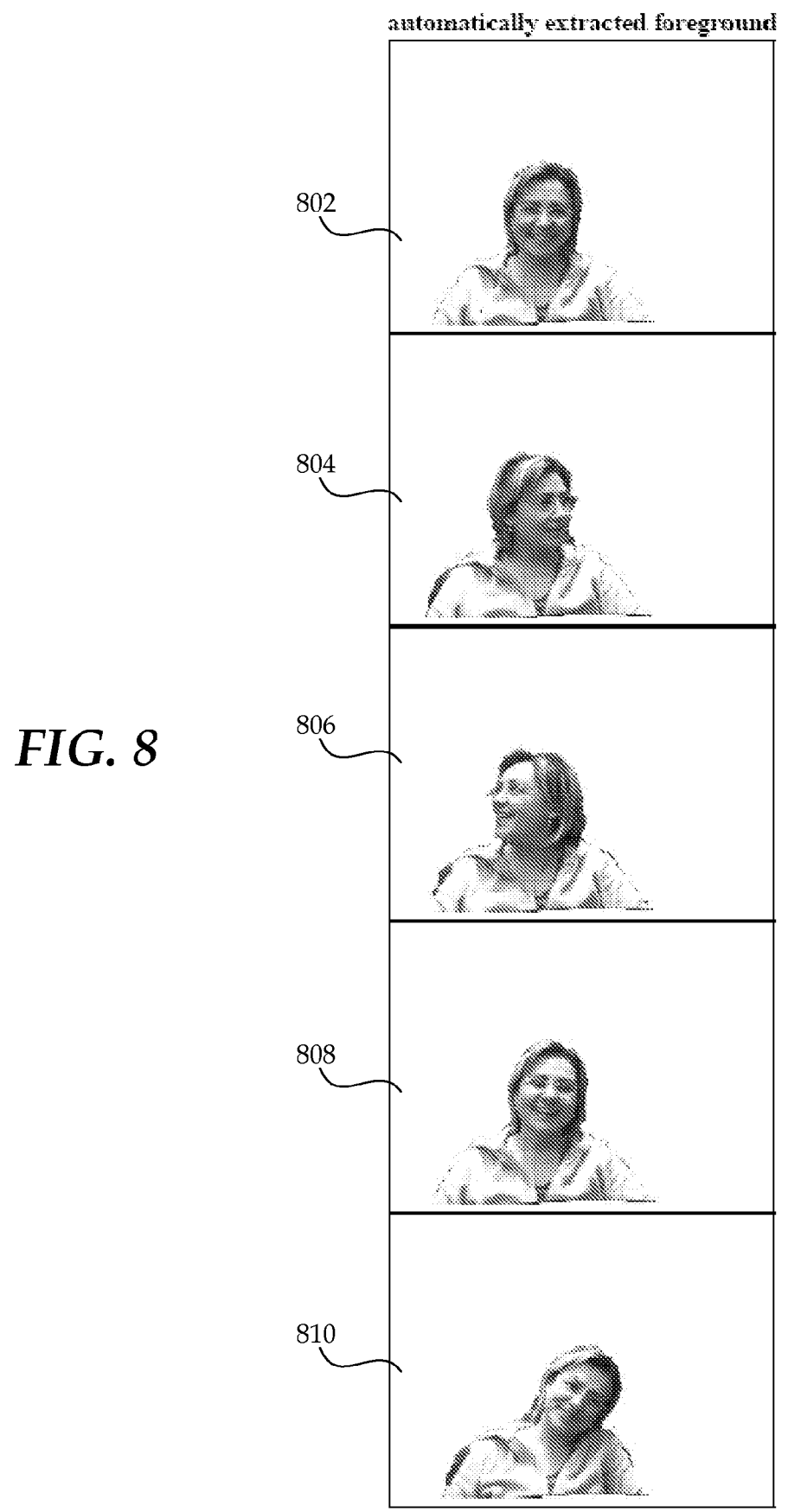
FIG. 8 illustrates a foreground segmentation of the image sequence of FIG. 7.
Figure 9:
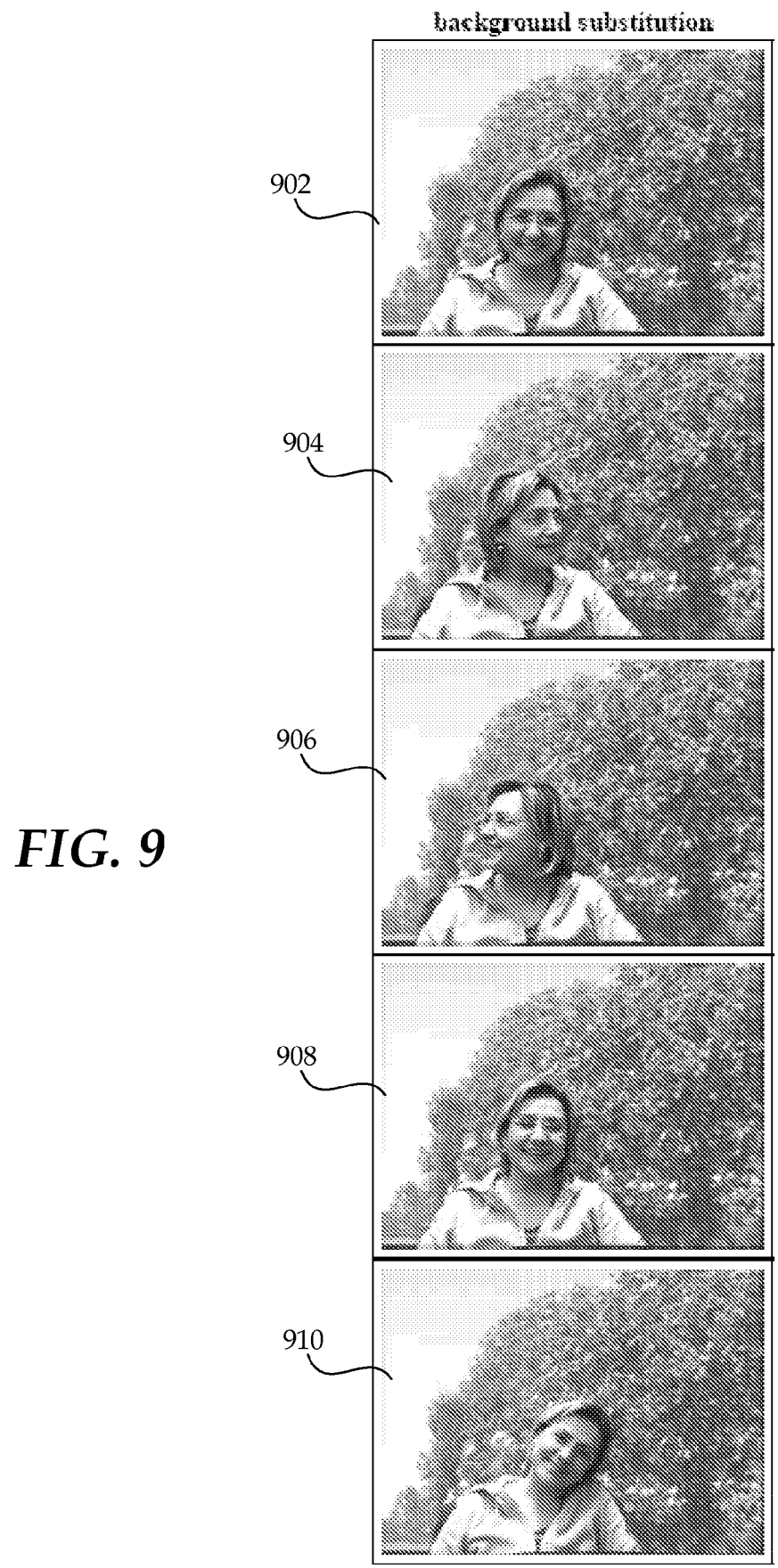
FIG. 9 illustrates a background substitution with the foreground segmentation of the image sequence of FIG. 8.

The labeled pixels in the image may allow the foreground of the image to be separated from the background of the image during image processing, such as by the image processor 220 of FIG. 2. For example, FIGS. 7-9 illustrate a sequence of images from a video stream illustrating background replacement. FIG. 7 illustrates a series of example input images 702, 704, 706, 708, 710 showing a woman in an office environment. FIG. 8 illustrates the foreground segmented pixels of the input images of FIG. 7 in the foreground frames 802, 804, 806, 808, 810. FIG. 9 illustrates an example background replacement of the pixels identified as background pixels in the input images of FIG. 7, or placement of the extracted foreground pixels of the images of FIG. 8 on another background image. More particularly, in FIG. 9, the extracted foreground of the images of FIG. 8 has been composited with a different background in the image frames 902, 904, 906, 908, 910 respectively where the new background is an outdoor scene. Since the extracted foreground is substantially free of alias, the resulting composition with the substituted background have a high level of visual realism.

Figure 10:
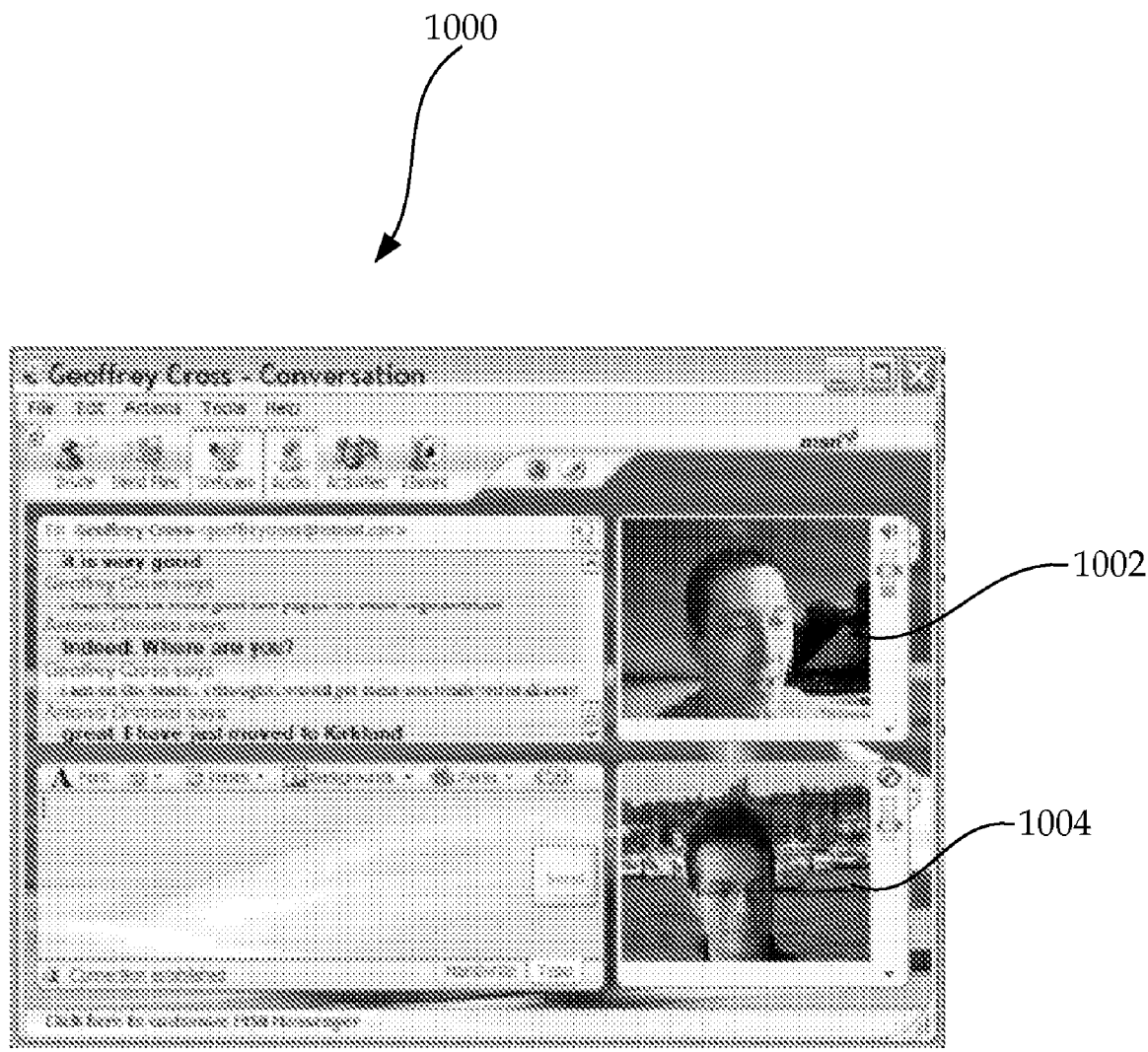
FIG. 10 illustrates an example frame display of substitution of a background in an on-line chat application.

FIG. 10 illustrates another example of substitution of a background. In this example, the above described segmentation process has been integrated within a desktop-based video-chat application having a display frame 1000 of FIG. 10. Having substituted the original office backgrounds with outdoor backgrounds (i.e., the beach in image 1002 and a harbor in image 1004), the two people are pretending to be somewhere else. Again, the lack of residual effects in the foreground/background segmentation allows substantially convincing resulting images with background substitution.

Figure 11:
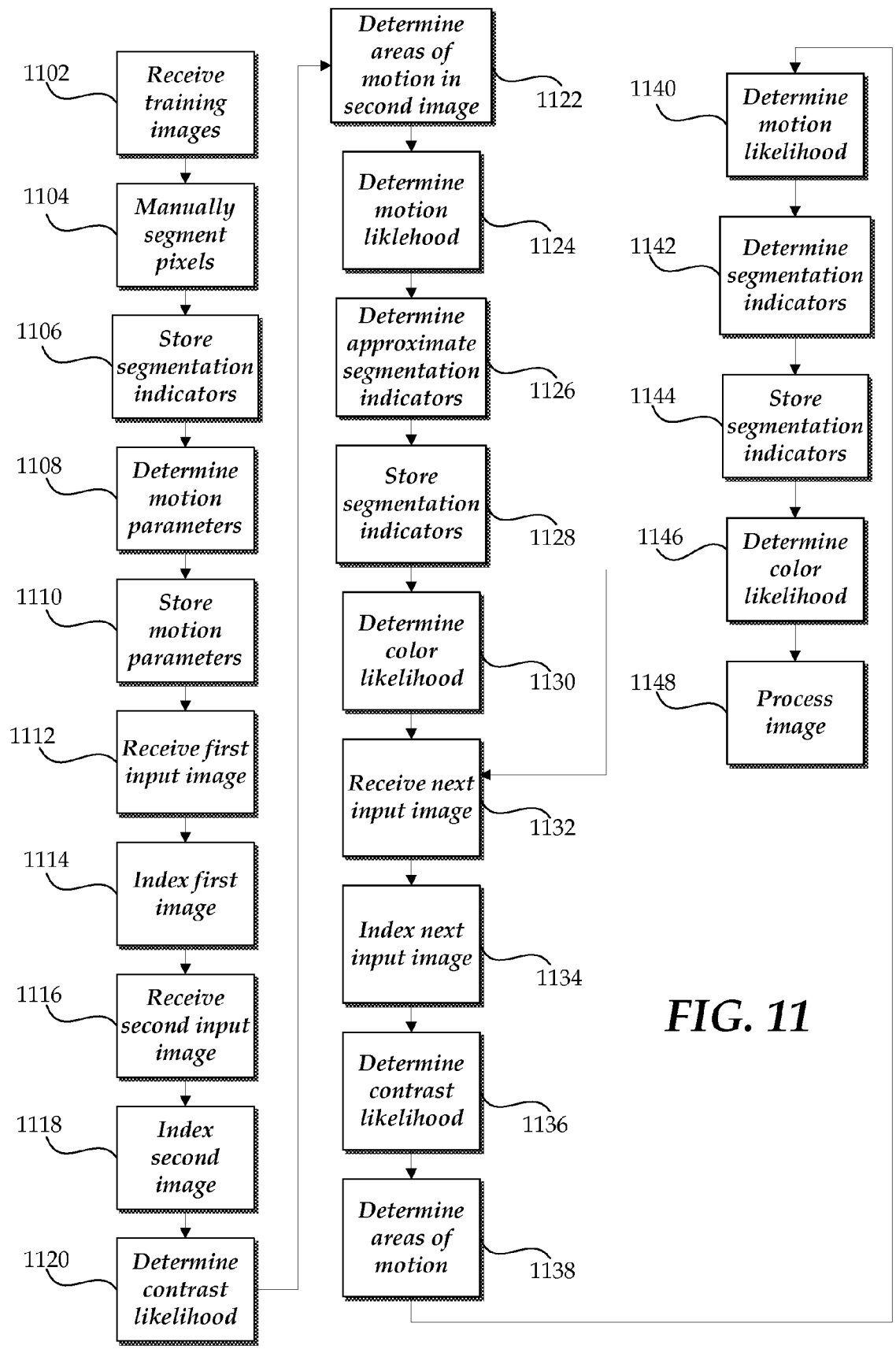
FIG. 11 illustrates an example image processing method.

Foreground/background separation and background substitution may be obtained by applying the energy minimization process described above. FIG. 11 illustrates an example method 1100 of segmenting images. A set of one or more training images may be received 1102. the training images may be any suitable training images, such as images which may be similar to those predicted in the segmentation application (e.g., a person's head and shoulders in a teleconferencing application), the first few seconds of video in the segmentation application, and the like. A plurality of pixels from one or more training images maybe manually segmented 1104 such as by labeling one or more pixels of the training images as foreground or background. The segmentation indicators associated with the pixels of the training images may be determined in any suitable manner, such as by manually labeling pixels or in a semi-manual process such as that discussed by Boykov et al. and Rother et al. cited above. The segment indicators for the pixels of the training images may be stored 1106 in any suitable manner and in any suitable format, such as in a data array which may be stored in a data store.

The motion parameter values may be determined 1108 based upon a comparison of a training image to a successive training image to determine pixel motion and upon the determined segmentation indicators of the pixels. the motion parameters may be determined in any suitable manner, such as by fitting a Gaussian mixture model to the foreground distributions of temporal and spatial gradients of the pixels in the labeled training images and by fitting another Gaussian mixture model to the background distributions of temporal and spatial gradients of the pixels in the labeled training images. The motion model parameters may be stored 1110 in any suitable manner such as in a data store.

The first image in a series of input images may be received 1112. The series of images may be received in any suitable manner such as from a video camera input device. However, it is to be appreciated that any number of cameras may be used. The images may be received by retrieving stored images from a data store, may be received from a communication connection, may be received from an input device, and the like. It is to be appreciated that the images may be received in different forms, at different times, and/or over different modes of communication. A plurality of pixels in the first input image may be indexed 1114 such as by the intensity indexer 212 of FIG. 2. The second image in the series of input images may be received 1116. A plurality of pixels in the second input image may be indexed 1118, such as by the intensity indexer 212 of FIG. 2.

The contrast likelihood may be determined 1120 such as by the segmentation module 216 based on the contrast model 234 of FIG. 2. Areas of motion may be determined 1122 in the second image. For example, the indexed pixels of the second image may be compared to the indexed pixels of the first image. The motion likelihood based on a temporal history may be determined 1124 such as by the segmentation module 216 based on the motion model 230 of FIG. 2. Using the motion likelihood and optionally the contrast likelihood, the segmentation indicators associated with one or more pixels of the second input image may be approximately determined 1126. More particularly, the motion likelihood and optionally the contrast likelihood may be used by the segmentation module to form an approximate energy equation which may be optimized to determine an approximate set of segmentation indicators for one or more pixels of the second input image. The approximate segmentation indicators may be stored 1128 and may be associated with the appropriate pixels of the second image.

The indexed pixels of the second input image and their associated segmentation indicators may be used to train the color model to determine the color parameters. For example, the color initialization module may use the segmentation indicators and pixel values of the second image to fit a Gaussian mixture model to the approximately identified foreground pixels using expectation maximization and/or may fit another Gaussian mixture model to the approximately identified background pixels using expectation maximization. The color likelihood may be determined 1130 based on the initialized color parameters.

The next (current) input image may be received 1132 in any suitable manner and may be indexed 1134. The contrast likelihood may be determined 1136 for the next (current) input image. Areas of motion may be determined 1138 in the next (current) image. For example, the indexed pixels of the next (current) image may be compared to the indexed pixels of the immediately prior image. The motion likelihood of the next (current) image based on a temporal history may be determined 1140 based on the segmentation of the previous frame. In some cases where there has been no or little motion in the series of images, e.g., 5 seconds, the motion likelihood values may lose reliability. Thus, in some cases, the weights of the motion likelihood may be adjusted if no movement has been detected for a predetermined period of time. for Using the motion likelihood of the next (current) image, the color likelihood of the prior image, and optionally the contrast likelihood, of the next (current) image, the segmentation indicators associated with one or more pixels of the next (current) input image may be determined 1142. More particularly, the motion likelihood, color likelihood, and optionally the contrast likelihood may be used by the segmentation module to form an energy equation which may be optimized to determine a set of segmentation indicators for one or more pixels of the next (current) input image. The segmentation indicators may be stored 1144 and may be associated with the appropriate pixels of the next (current) image.

The indexed pixels of the next (current) input image and their associated segmentation indicators may be used to train the color model to determine 1146 the color likelihood for the next (current) image. The process may return to receiving 1132 the next input image with each subsequent input image to be segmented. Each subsequent input image may be segmented using the motion likelihood of the current input image, the color likelihood of the prior input image, and optionally the contrast likelihood of the current input image. As noted above, the color likelihood may be dialed in, such as by using a weighting term which changes value over time or in response to changes in confidence in the initialized color likelihood.

The input image and its associated segmentation indicators may be processed 1148, such as by the image processor 220 of FIG. 2, to modify the input image in some manner. For example, the segmentation indicators indicating foreground pixels may be used to extract the foreground objects from the input image, store or compress the associated foreground pixels at a higher fidelity than other pixels, allow a dynamic emoticon to move in front of and behind an identified foreground object while remaining in front of the background objects, positioning or locating a smart-frame around the identified foreground object(s), and the like.

While the preferred embodiment of the invention has been illustrated and described, it will be appreciated that various changes can be made therein without departing from the spirit and scope of the invention. For example, although the above examples describe segmenting monocular image data, it is to be appreciated that stereo image data may be segmented in a similar manner. Moreover, in some cases with stereo information, the motion, color and optionally contrast likelihoods may be fused with a disparity likelihood and matching likelihood determined from the stereo information. The above-described fusion of motion and color likelihoods and optional contrast likelihood is sufficient to allow the segmentation to occur substantially without alias in real-time applications and video streams. To segment the foreground and background regions in image data, the motion and color/contrast cues within a Markov Random Field energy minimization framework for bilayer segmentation of video streams may be fused. In addition, motion events in image sequences may be detected without explicit velocity computation. The combination of the motion and color and optionally contrast yields accurate foreground/background separation with real-time performance.

The invention claimed is:

1. One or more computer readable storage media containing computer readable instructions that, when implemented, perform a method comprising:
   determining a first likelihood ratio of motion as compared to non-motion for each of a first plurality of pixels of a first input image;
   determining a first segment indicator for each of the first plurality of pixels, each first segment indicator indicating a foreground pixel or a background pixel;
   determining a first likelihood ratio of color for each of the first plurality of pixels based on the first segment indicators;
   determining a second likelihood ratio of motion as compared to non-motion for each of the second plurality of pixels of a second input image subsequent to the first input image;
   determining a second segment indicator for each of the second plurality of pixels based on the second likelihood ratio of motion and the first likelihood ratio of color, each second segment indicator indicating a foreground pixel or a background pixel; and
   storing the second segment indicators in a data store.

2. The one or more computer readable storage media of claim 1, further comprising determining a spatial smoothness for each of the second plurality of pixels based on a contrast model, and wherein determining the second segment indicators is based on the spatial smoothness.

3. The one or more computer readable storage media of claim 1, wherein determining the second segment indicators includes minimizing an energy function based on the second likelihood ratio of motion and the first likelihood ratio of color.

4. The one or more computer readable storage media of claim 3, wherein minimizing includes using a graph cut.

5. The one or more computer readable storage media of claim 4, further comprising modifying, based on the second segment indicators, a display of at least a portion of the second input image.

6. The one or more computer readable storage media of claim 4, further comprising determining one or more motion parameters of the first and second likelihood ratios of motion based on a set of segmented training images different from the first and second input images.

7. A computing environment comprising a processing unit configured to execute operations, the operations comprising:
   determining a first likelihood ratio of motion as compared to non-motion for each of a first plurality of pixels in a first image in a first data store;
   determining a first segment indicator for each of the first plurality of pixels, each first segment indicator indicating a foreground pixel or a background pixel;
   determining a first likelihood ratio of color for each of the first plurality of pixels based on the first segment indicators;
   determining a second likelihood ratio of motion as compared to non-motion for each of a second plurality of pixels, the second plurality of pixels contained in a second image;
   determining a second segment indicator for each of the second plurality of pixels based on the second likelihood ratio of motion and the first likelihood ratio of color, each second segment indicator indicating a foreground pixel or a background pixel; and
   storing the second segment indicators in a second data store.

8. The computing environment of claim 7, the operations further comprising determining a spatial smoothness for each of the second plurality of pixels based on a contrast model, and wherein determining the second segment indicators is based on the spatial smoothness.

9. The computing environment of claim 7, wherein determining the second segment indicators includes minimizing an energy function based on the second likelihood ratio of motion and the first likelihood ratio of color.

10. The computing environment of claim 9, wherein minimizing includes using a graph cut.

11. The computing environment of claim 10, the operations further comprising modifying, based on the second segment indicators, a display of at least a portion of the second input image.

12. The computing environment of claim 10, the operations further comprising determining one or more motion parameters of the first and second likelihood ratios of motion based on a set of segmented training images different from the first and second input images.

13. A method comprising:
   determining, using a processing unit, a first likelihood ratio of motion as compared to non-motion for each of a first plurality of pixels, a first image comprising the first plurality of pixels, a first data store comprising the first image;
   determining a first segment indicator for each of the first plurality of pixels, each first segment indicator indicating a foreground pixel or a background pixel;
   determining a first likelihood ratio of color for each of the first plurality of pixels based on the first segment indicators;
   determining a second likelihood ratio of motion as compared to non-motion for each of a second plurality of pixels, the second plurality of pixels contained in a second image;
   determining a second segment indicator for each of the second plurality of pixels based on the second likelihood ratio of motion and the first likelihood ratio of color, each second segment indicator indicating a foreground pixel or a background pixel; and
   storing the second segment indicators in a second data store.

14. The method of claim 13, further comprising determining a spatial smoothness for each of the second plurality of pixels based on a contrast model, and wherein determining the second segment indicators is based on the spatial smoothness.

15. The method of claim 13, wherein determining the second segment indicators includes minimizing an energy function based on the second likelihood ratio of motion and the first likelihood ratio of color.

16. The method of claim 15, wherein minimizing includes using a graph cut.

17. The method of claim 16, further comprising modifying, based on the second segment indicators, a display of at least a portion of the second input image.

18. The method of claim 16, further comprising determining one or more motion parameters of the first and second likelihood ratios of motion based on a set of segmented training images different from the first and second input images.

19. The method of claim 13, wherein the first data store is the same as the second data store.

* * * * *